United States Patent [19]

Irwin

[11] Patent Number: 4,703,420
[45] Date of Patent: Oct. 27, 1987

[54] SYSTEM FOR ARBITRATING USE OF I/O BUS BY CO-PROCESSOR AND HIGHER PRIORITY I/O UNITS IN WHICH CO-PROCESSOR AUTOMATICALLY REQUEST BUS ACCESS IN ANTICIPATION OF NEED

[75] Inventor: John W. Irwin, Georgetown, Tex.

[73] Assignee: International Business Machines Corporation, Armonk, N.Y.

[21] Appl. No.: 706,804

[22] Filed: Feb. 28, 1985

[51] Int. Cl.⁴ ............................................. G06F 13/18
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,403,303 | 9/1983 | Howes | 364/900 |
| 4,417,304 | 11/1983 | Dinwiddie | 364/200 |
| 4,441,162 | 4/1984 | Lillie | 364/900 |
| 4,453,214 | 6/1984 | Adcock | 364/200 |
| 4,463,445 | 7/1984 | Grimes | 364/900 |
| 4,493,036 | 1/1985 | Boupreau et al. | 364/200 |
| 4,556,952 | 12/1985 | Brewer | 364/900 |
| 4,562,535 | 12/1985 | Vincent | 364/200 |
| 4,602,327 | 7/1986 | LaViolette | 364/200 |

OTHER PUBLICATIONS

"Memory Access Technique", by H. T. Ward, *IBM Technical Disclosure Bulletin*, vol. 21, No. 3, pp. 992-994.

*IBM Tech. Disclosure Bull.*, vol. 26, No. 7A, Dec. 1983, "Method for Decreasing Arbitration Overhead", by Bergey et al, pp. 3370-3371.

*Primary Examiner*—Gary V. Harkcom
*Assistant Examiner*—Lawrence E. Anderson
*Attorney, Agent, or Firm*—Richard E. Cummins; J. B. Kraft; Thomas E. Tyson

[57] ABSTRACT

A data processing system having a main processing unit, a memory subsystem, and a co-processor selectively connectable to said memory subsystem through an Input/Output Channel Controller which includes a control means for arbitrating access to the I/O Bus among the co-processor and the other I/O devices connected to the Bus. Since the co-processor runs programs stored in the memory subsystem, there is a tendency for the co-processor to monopolize the bus with instruction fetch cycles, thereby excluding other I/O devices from access to the bus. The control means for arbitrating responds to requests on the basis of a linear priority scheme in which the co-processor has the lowest priority. Each device, except the co-processor, is permitted to keep control of the bus until it voluntarily relinquishes it. The co-processor, on the other hand, relinquishes control of the bus in response to a request for access by any higher operator. However, control is returned automatically to the co-processor in the absence of any other request, since the co-processor continually raises its access request line.

7 Claims, 6 Drawing Figures

SYSTEM FOR ARBITRATING USE OF I/O BUS BY CO-PROCESSOR AND HIGHER PRIORITY I/O UNITS IN WHICH CO-PROCESSOR AUTOMATICALLY REQUEST BUS ACCESS IN ANTICIPATION OF NEED

TECHNICAL FIELD

This invention relates in general to Information Handling systems (IHS) in which the Input/Output devices are connected to the processor by means of an Input/Output Bus and an Input/Output Channel Controller (IOCC) and, in particular, to an arrangement for arbitrating which I/O device is connected to the I/O Bus.

BACKGROUND ART

The prior art discloses various arrangements for connecting Input/Output (I/O) devices to the central processing unit of a data processing system. As the speed of central processing units increased relative to the speed of the I/O units, it became evident that the function of controlling I/O devices was severely impacting the overall performance of the data processing system. As a result, this control function was separated from the main processor and assigned to the Input/Output Channel Controller (IOCC) which provided the main control interface between the Central Processing Unit (CPU) and the I/O bus to which any number of different types of I/O devices were attached.

In many systems where the system memory is separate from the Central Processing Unit (CPU) and had its own memory controller and memory bus, the IOCC also interfaced with the memory controller so that an input/output data path was established between the I/O devices and the system memory.

When the I/O subsystem involves a limited number of conventional I/O devices such as displays and printers and a disk or tape storage device, the control problem is relatively straightforward since the bus generally does not become overloaded and simple polling schemes and/or priority arrangements can be used quite successfully. As various types of functions are placed outboard of the CPU, the IOCC must be able to accommodate their specific data transfer requirements without impacting the performance of other devices on the bus. In systems where the CPU interrupt control function and the memory refresh function are placed on the I/O bus, the prior art priority screens have been generally acceptable in providing appropriate access to the I/O bus.

In some data processing system applications which involve considerable processing of numerical data, the CPU can be tied up for a period of time. If the system is an interactive system in which an operator must wait for the CPU to complete the numerical processing before being able to proceed, even a period as short as one or two minutes can be quite frustrating for the operator and impact overall system performance. To avoid this type of problem, it has been suggested that the system be provided with the capability of adding a co-processor onto the I/O bus. While such an arrangement is readily implementable, a problem is created in that prior art suggestions for granting access to the bus are no longer valid, since the co-processor requires access to the I/O bus on a regular basis to obtain instructions from the main system memory. Co-processor instruction fetch operations could use the I/O bus efficiently for all periods of time not required to refresh the co-processor memory. If allowed, the co-processor would "hog" the bus to the exclusion of requests from all other devices connected to the I/O bus. The I/O bus, therefore, becomes overloaded since the co-processor could fetch instructions 90% of the time and the memory refresh operation for the co-processor would occupy the remaining 10%.

If all the I/O devices connected to the I/O bus run at full capacity, the bus is over-committed and conventional prior art priority schemes would lock out a device from access to the channel.

An I/O bus arbiter scheme for an I/O subsystem having a co-processor attached to the I/O bus which permits an efficient utilization of the bus by all devices is therefore desirable. The present invention provides such an I/O bus arbiter system for a data processing system.

SUMMARY OF INVENTION

In accordance with the present invention, a system is provided for controlling access to an I/O bus where one of the I/O devices connected to the bus is a co-processor that would normally consume all of the available capacity of the I/O bus in refreshing its memory and fetching instructions from the system memory.

The improved I/O bus control arrangement arbitrates access to the bus to insure maximum bus utilization. The arrangement recognizes that while the co-processor is by far the highest user of the bus for instruction fetch opeations, the priority of this fetch operation can be the lowest priority, relative to all other I/O devices connected to the bus. The arrangement further recognizes that the refresh operation for the memory of the co-processor and PIO (Programmed I/O) from the CPU are of higher priority. The arbitration system, therefore, allows the co-processor to keep the channel at each grant so long as no other (higher priority) usage is requested. Whenever a higher priority usage is requested, the co-processor is made to vacate the channel at the first possible point in the bus cycle. The co-processor, after vacating the channel, continuously issues requests for access to the channel which are only granted when no higher priority request is being serviced or pending.

The invention further discloses an implementation of the arbiter arrangement which causes the co-processor to vacate the channel without modifying the existing I/O channel protocols for channel access and acknowledgement and without requiring any additional input pins for the co-processor. The arbiter design requires that one bus signal for the co-processor differ from normal arbitration signals. The assigned socket for the co-processor is modified to replace one signal that is used by very few I/O devices with the special co-processor arbitration signal. If the co-processor is not installed, virtually all other I/O devices can occupy this special socket without problems. The normal use of the I/O channel and its protocols are not disturbed by the absence of the co-processor from the channel.

It is, therefore, an object of the present invention to provide an improved data processing system in which a co-processor is attachable to the I/O channel in a manner which permits efficient utilization of the channel by all of the attached devices.

Another object of the present invention is to provide an improved system and method for arbitrating access to an I/O channel of a data processing system where one of the I/O devices is a co-processor requiring access to the main system memory for instruction fetch operations.

A further object of the present invention is to provide a bus arbiter scheme for a plurality of input/output devices in which an attached co-processor is allowed to obtain control of the bus for instruction fetch operations in the absence of any other requests and is made to relinquish control in response to a request by any other I/O device.

Objects and advantages other than those mentioned above will become apparent from the following description when read in conjunction with the drawing.

DETAILED DESCRIPTION OF THE INVENTION

Figure 1:
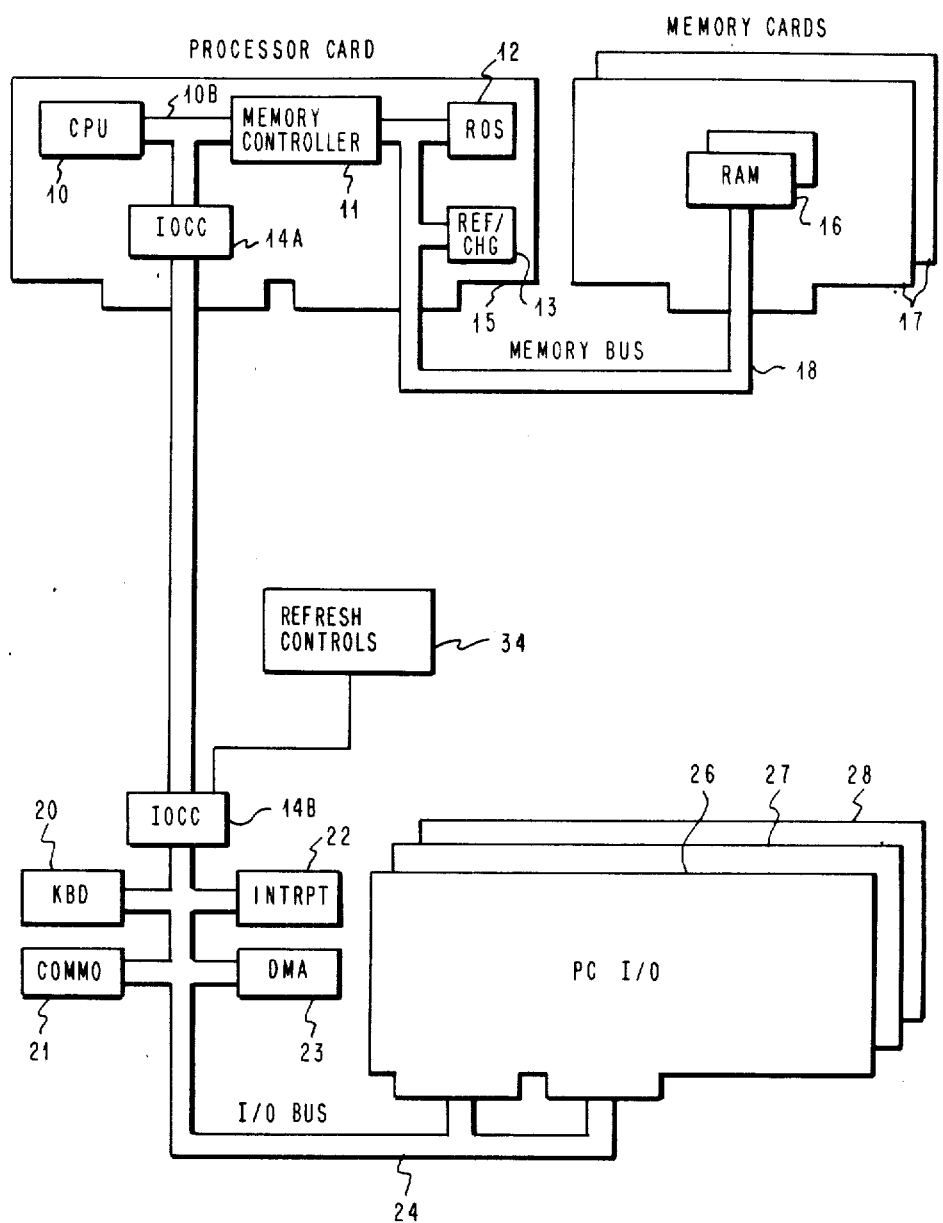
FIG. 1 is a block diagram of a data processing system involving the present invention.

As shown in FIG. 1, the data processing system comprises a CPU block 10, a Memory Controller block 11, a Read Only Storage block (ROS) 12, a refresh/charge block 13, and an Input/Output Channel Controller (IOCC) block 14A. In the preferred embodiment, each of these blocks is a separate integrated circuit module which is mounted on a conventional printed circuit card 15. Circuit card 15 is referred to as the processor card.

The system further includes the plurality of Random Access Memory (RAM) blocks 16, which are also integrated memory modules mounted on memory cards 17. A memory bus 18 extends between Memory Manager 11 and RAM block 16. ROS block 12 and refresh/charge block 13 are connected to memory bus 18. Bus 18 includes a portion for supplying address information to the RAM module 16, along with a portion for supplying data and control signals. It can be assumed that the memory bus comprises 32 data lines and 32 lines for address and control signals. The bus may also include such lines as parity check lines for both the data and the control signals.

The output of the CPU block 10 is connected to the Memory Controller 11 and to the IOCC block 14A by the CPU bus 10B which is also 64 bits wide.

The IOCC shown in FIG. 1 comprises the portion 14A which is mounted on the processor card 12 and a portion 14B which interfaces with a number of connected I/O blocks. As shown in FIG. 1, a keyboard 20, a communications device 21, an interrupt controller 22, and a Direct Memory Access controller (DMA) 23 are attached to the I/O bus 24. In addition, I/O bus 24 includes sockets into which the I/O cards 26, 27, and 28 may be plugged for mounting other functions of the PC.

Figure 2:
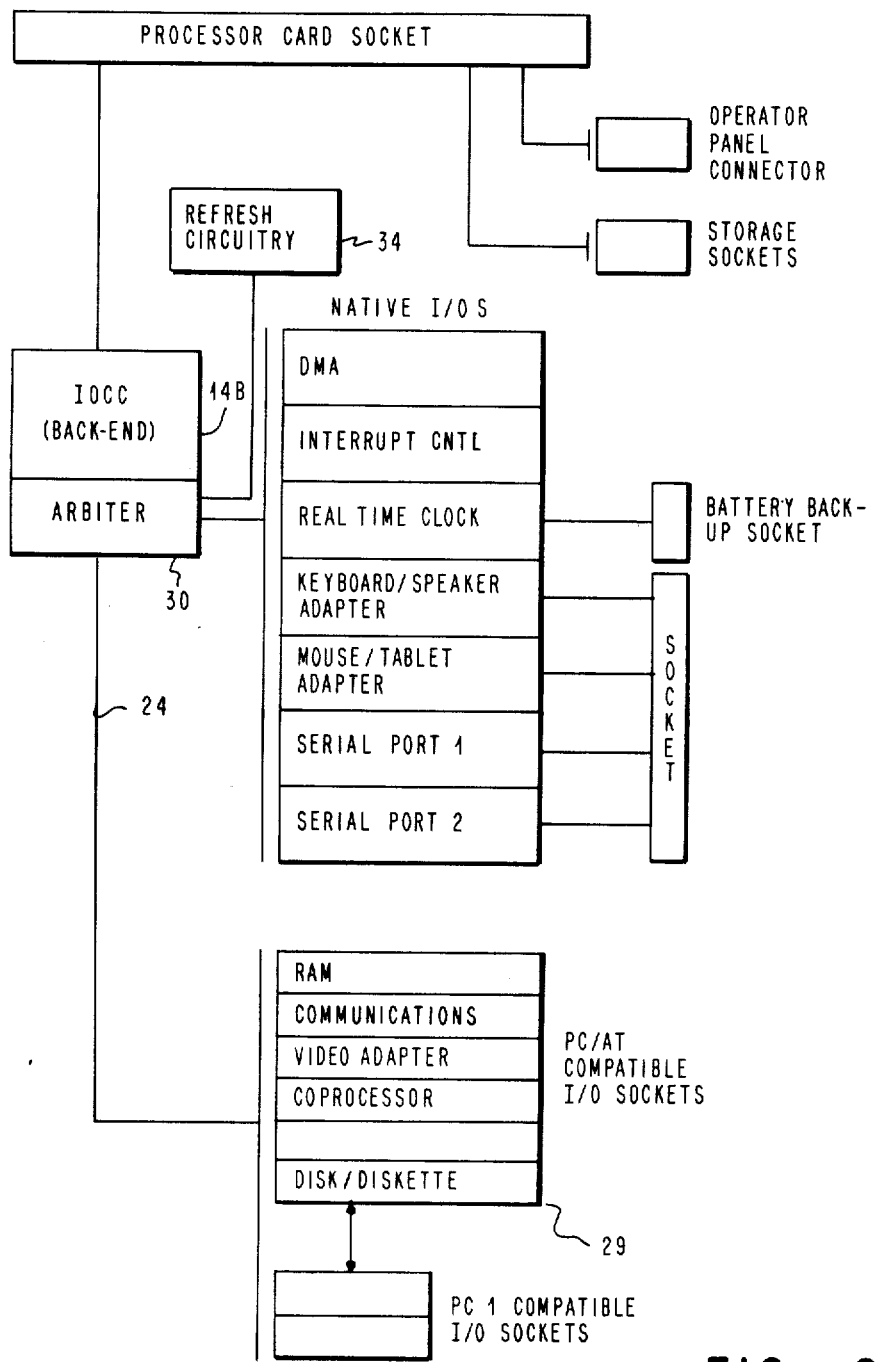
FIG. 2 is a more detailed block diagram of the I/O channel shown in FIG. 1.

FIG. 2 illustrates, in more detail, some of the native I/O functions which are directly attachable to the IOCC 14B, and other functions which are attached through removable cards. PC cards 26, 27, and 28 shown in FIG. 1 are represented by block 29 in FIG. 2 and correspond generally to a conventional standard PC removable card employed in various IBM Personal Computers. As shown, the co-processor is provided with its own RAM memory module, a communications port, a display port, and a processor module which functions as the co-processor for the system shown in FIG. 1.

In addition, a disk and diskette adapter for connecting suitable disk storage devices is also provided.

Figure 3:
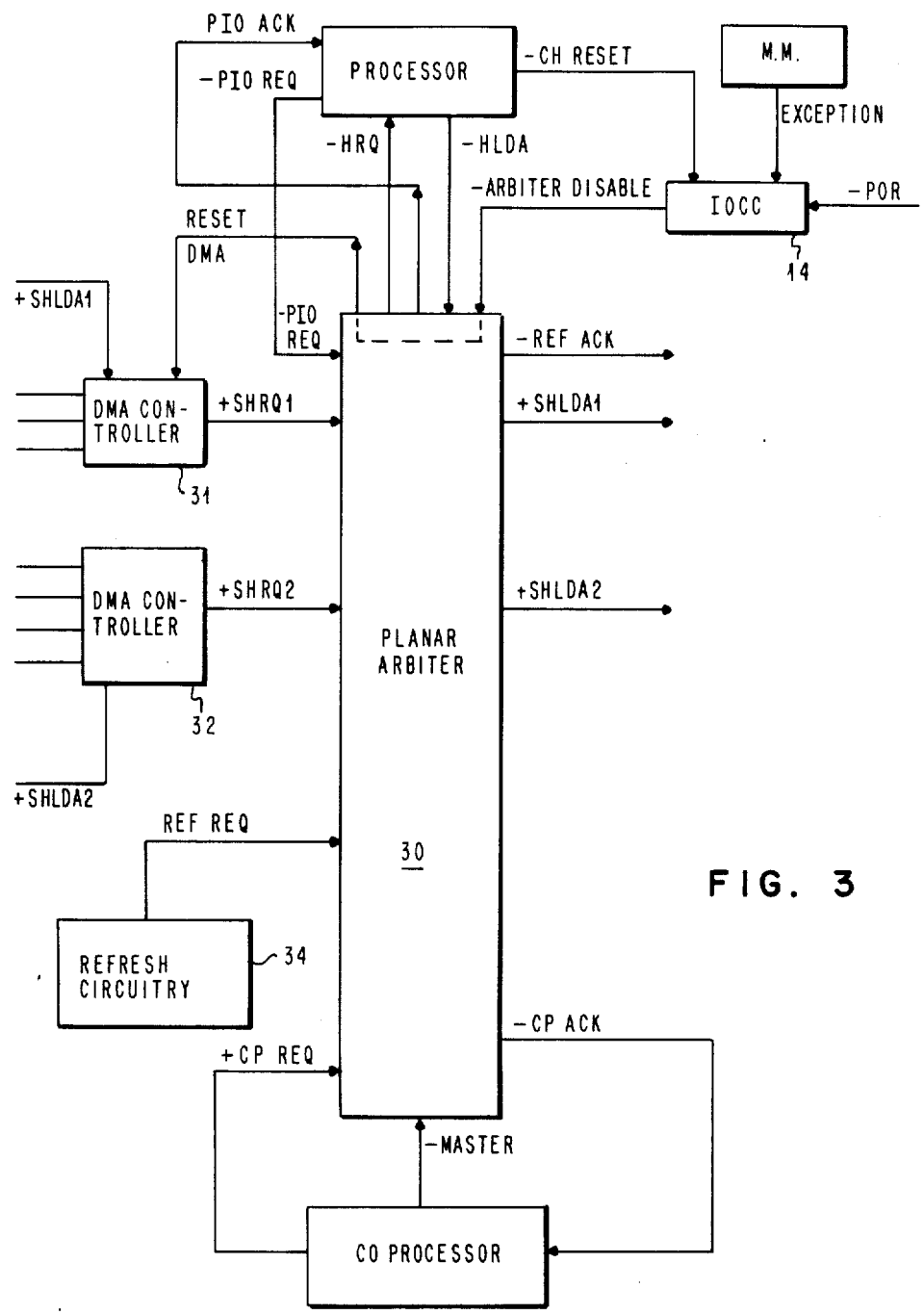
FIG. 3 is a diagrammatic view showing the signal relationships between the arbiter and the various system components shown in FIGS. 1 and 2.

I/O bus 24 comprises both data and control lines, each of which is 16 bits wide and has an architecture that is identical to the I/O bus architecture of the IBM PC-AT model. The relationship of the arbiter 30 to the various other system components is shown in FIG. 3. The processor card 15, as shown in FIG. 1, is the default "owner" of the I/O bus. When a DMA device, such as the display printer, wants to use the bus 24, a request must be made to the arbiter 30 through one of the DMA controllers 31 or 32. After detecting the request, the arbiter 30 requests control of the I/O bus by the signal —HRQ (Hold Request) to the processor card. The signal —HLD A (Hold Acknowledge) is returned to the arbiter 30 if control can be granted. The arbiter 30 then issues an appropriate acknowledgement signal to the requesting device which, under the assumed example, would be either the +SHLDA1 or +SHLDA2 (Share Hold Acknowledge 1 or 2) signals to the DMA controllers 31, 32. The DMA controllers monitor and prioritize the requests from the DMA devices that are attached and determine which DMA device is to receive the acknowledgement signal. When the DMA controller activates its acknowledgement line to the specific DMA device, it becomes attached to the I/O bus 24.

The signal REF REQ (Refresh Request) supplied to the arbiter originates from the circuitry 34 which is employed to provide refresh signals to the memory that is attached to the I/O bus and employed by the co-processor. Since the memory must be refreshed on a periodic basis or errors might occur, the REF REQ signal is of higher priority than the +SHRQ1 and SHRQ2 signals from the DMA controllers 31 and 32.

The signal —PIO REQ (Programmed I/O Request) is derived from the processor and is active when a request is pending to regain control of the I/O bus. The request is granted only when all DMA request and refresh requests have been satisfied. When the request is granted, the arbiter deactivates the —HRQ (Hold Request) signal which informs the processor card that the I/O bus has been relinquished and is now under the control of the processor card 15.

The last input request to the arbiter is the +CP REQ (Co-Processor Request) from the co-processor. This request is acknowledged to the co-processor by the signal —CP ACK (Co-Processor Acknowledgement). Since the co-processor is capable of using the I/O bus about 90% of the time for fetching instructions, it is assigned the lowest priority and is capable of being "bumped" from the channel by any higher priority request. The co-processor relinquishes control of the bus at the end of the next cycle following the dropping of the acknowledgement signal +CP ACK which activates the signal —MASTER to the arbiter.

The manner in which the CP acknowledgement is caused to drop is described later on, in connection with FIG. 4.

If the co-processor is using the I/O bus when the processor card wants control, the co-processor acknowledgement signal is deactivated, which removes the +CP REQ signal to the arbiter. The co-processor completes the current bus sequence and deactivates the signal—MASTER to inform the arbiter that the bus is clear. The —HRQ (Hold Request) signal is thus deactivated.

In summary, the signals capable of requesting access to the I/O bus in the order of priority are:
+REF REQ
+SHREQ1 (CH 0, 1, 2, 3)
+SHREQ2 (CH 5, 6, 7)
—PIO REQ
+CP REQ The priority is linear. Once a device is granted control of the I/O bus, it maintains control until the device drops its request. The manner in which the co-processor is forced to drop its request at the end of an operating cycle will now be described in connection with FIGS. 4 and 5.

Figure 4:
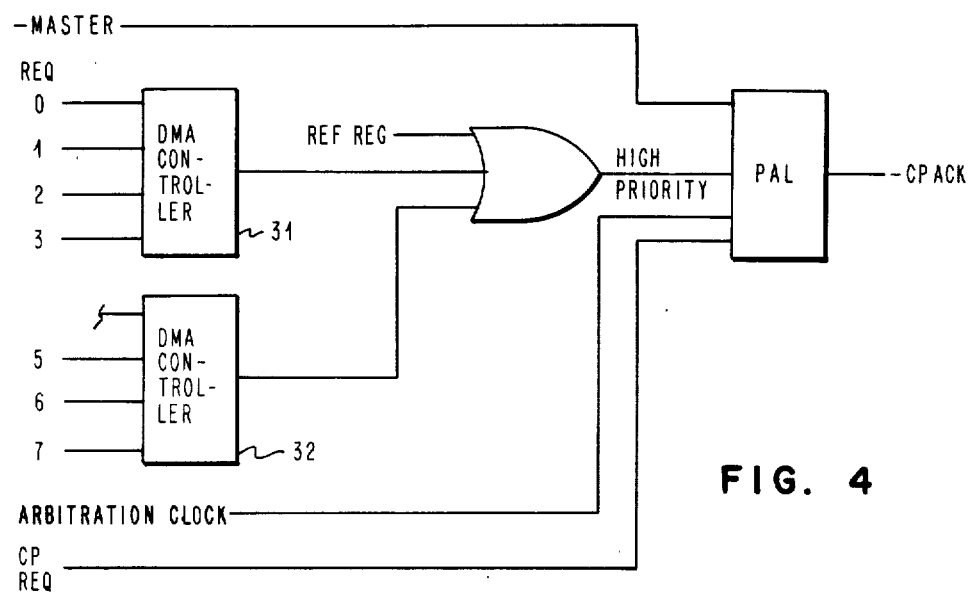
FIG. 4 is a view of the logic employed for advising the co-processor to relinquish the I/O bus.
Figure 5:
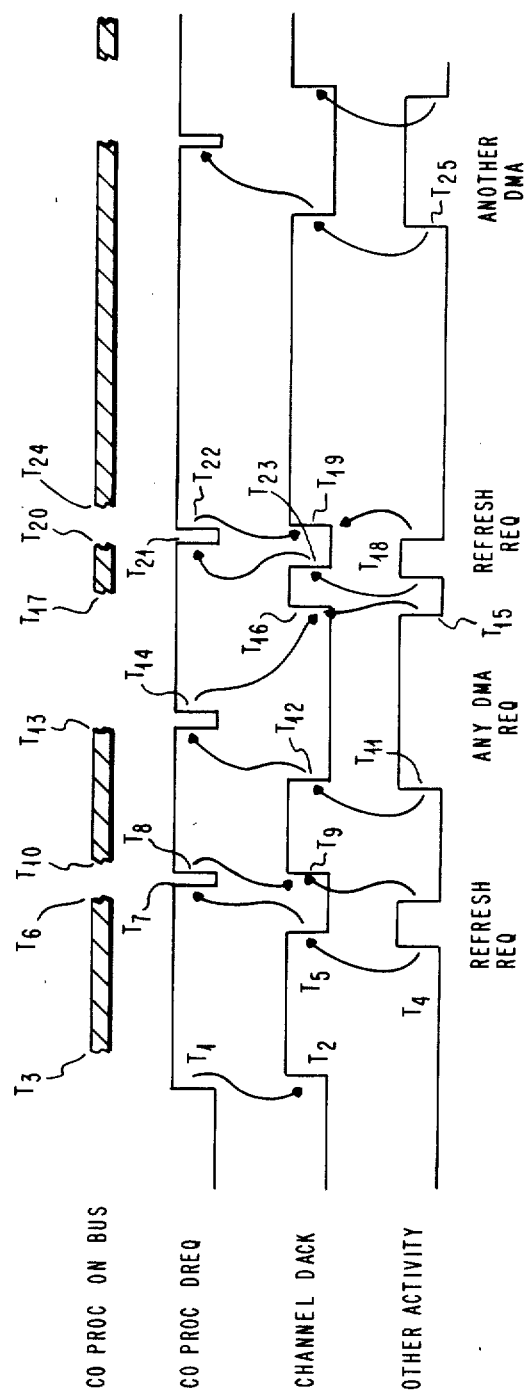
FIG. 5 is a timing chart to illustrate the operation of the co-processor over several sequential requests for the I/O bus.

The logic circuit of FIG. 4 is the heart of the arbiter and functions to deactivate the —CP ACK signal in response to a request from the bus from any other device attached to the bus. Block 41 comprises a Programmable Logic Array (PLA) which is supplied with four input signals, +CP REQ, High Priority, Arbitration Clock, and —Master. The Co-Processor request signal is, as previously described and as shown in FIG. 5, a signal that is continuously requesting access to the bus except for the period when the line drops to recycle the logic of the arbiter 30. The trailing edge of the signal DACK (which represents any one of the higher priority acknowledgement line signals) is used to notify the Co-Processor that it should vacate the bus by dropping the Co-Processor request line +CP REQ. The sequence of the events, as shown in FIG. 5, starts with the +Co-Proc signal being rasied at time T1 which is acknowledged by the channel DACK signal being raised at T2 and the Co-Processor obtaining control at T3. At T4, the Refresh Request signal is received by the arbiter which causes the Channel DACK signal to drop at T5 which, in turn, causes the Co-Processor to relinquish the bus at T6. The Co-Processor request signal drops at T7 for a short period, but then automatically raises again at T8. Since there is no other activity on the bus at that time, an acknowledgement is provided at T9 to the Co-Processor and the Co-Processor resumes control of the bus.

At T11, a DMA request is made which deactivates the Co-Processor DACK signal at T12. The Co-Processor relinquishes control by T13, and at T14, is back requesting control. Since the DMA request is still pending, no acknowledgement is made to the Co-Processor until, at T15, the DMA request line is deactivated which, in turn, permits the DACK signal to be raised at T16. The Co-Processor once again gains control of the bus at T17, only to lose it when another Refresh Request access signal occurs at T18, causing the DACK signal to drop at T23 and the Co-Processor to relinquish the bus at T20. The Co-Processor request signal, therefore, drops at T21.

Another Co-Processor request is made immediately at T19, which is granted at T23. The Co-Processor obtains control at T24 until another DMA request is received at T25. The operation continues in the manner just described with the various functions obtaining control by causing the Co-Processor to relinquish control at the end of a normal bus cycle.

Figure 6:
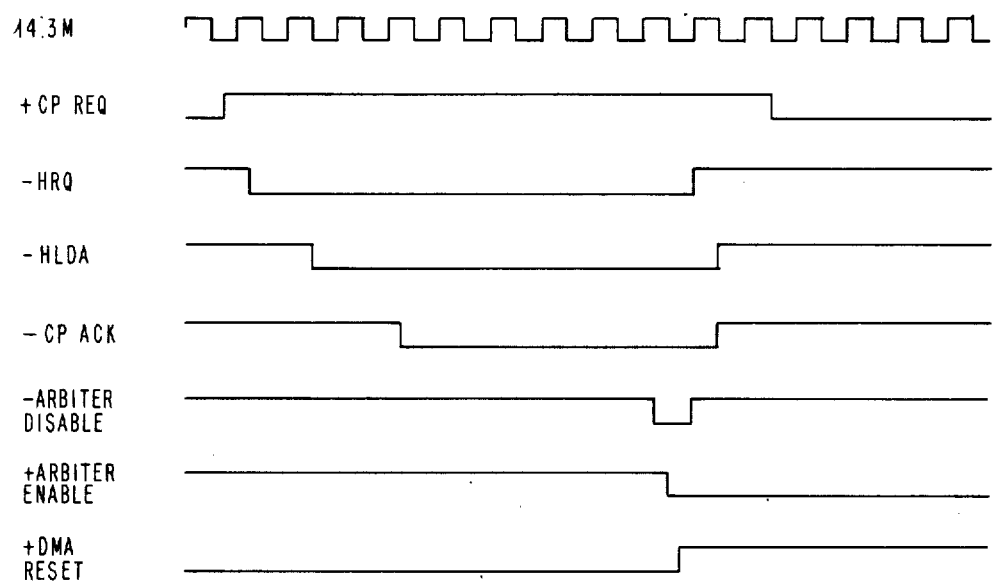
FIG. 6 is a timing chart, illustrating the timing relationship of the signals involved in disabling the arbiter.

As shown in FIG. 3 and FIG. 6, the signal—"arbiter disable" is connected to the arbiter 30 from the IOCC block 14. The Arbiter can be disabled when the Memory Controller 11 sends an exception reply to the I/O channel controller on a DMA transfer. The—"arbiter disable" signal resets a latch in the arbiter 30 to provide the arbiter enable signal. The arbiter active disable signal also causes the DMA controllers 31 and 32 to be reset. This reset causes the DMA controllers to release the bus, and provides an opportunity to rectify the situation that caused the exception from the Memory Controller. If the exception was caused by the Co-Processor, the reset is still sent to the DMA controllers and the Co-Processor acknowledgement signal is deactivated, causing the Co-Processor to relinquish control of the bus at the end of the current bus cycle.

The arbiter is also disabled when the Power On Reset signal (—POR) is supplied to the IOCC 14. The processor card can also disable the arbiter by issuing a — "channel reset" signal (—CH RESET).

The above-described Arbiter arrangement permits a Co-Processor to be attached to the I/O bus of a data processing system so that other I/O device functions are only minimally impacted and the bus is fully utilized.

While the invention has been particularly shown and described with reference to a preferred embodiment thereof, it will be understood by those skilled in the art that various changes in the form and detail may be made without departing from the scope and spirit of the invention.

I claim:

1. A data processing system comprising in combination
    (a) a Central Processing Unit (CPU)
    (b) a memory subsystem connected in data transferring relationship to said CPU, and
    (c) an Input/Output (I/O) subsystem connected in data transferring relationship with said CPU and said memory subsystem, said I/O subsystem comprising
        (1) an I/O Channel Controller (IOCC),
        (2) an I/O Bus connected to said IOCC,
        (3) a plurality of Input/Output (I/O) units each of which is selectively connectable in a data transferring relationship to said I/O Bus and each of which includes means for generating an access request signal when said unit requires access to said I/O bus, and
        (4) a Co-Processor which is selectively connectable in a data transferring relationship to said I/O Bus, said Co-processor having,
            (a) a separate clock for asynchronously clocking an instruction fetch cycle for transferring an instruction stored in said memory subsystem to said co-processor through said bus, and
            (b) means for automatically requesting access to said I/O bus for said co-processor a predetermined time, measured by said separate clock, after said coprocessor relinquishes access of said bus whether or not said co-processor needs said bus, including means for developing a two level signal and means for switching from a first level to a second level at said predetermined time.
        (5) said IOCC including, (a) arbiter means for controlling access to said I/O Bus by said co-processor and I/O units in accordance with a preestablished priority plan, said arbiter means including (i) circuit means connected to receive said two level signal and operable in repsonse to said second level to grant said Co-processor access to said I/O bus provided none of said other I/O units are requesting access to said I/O bus, said circuit means also connected to receive said access request signals from said I/O units and operable in response to receiving one said access request signal to cause said Co-processor to immediately return said two level signal to said other level whereby said co-processor relinquishes access of said I/O bus immediately if the co-processor is not using said I/O bus or at the termination of the current instruction fetch cycle if the Co-processor is then using said bus.

2. The system recited in claim 1 in which said memory subsystem stores program instructions to be executed by said Co-Processor and said Co-Processor is selectively connected to said memory subsystem in said data transferring relationship via said I/O Bus during each said instruction fetch cycle of said Co-Processor.

3. The system recited in claim 2 in which each of said I/O units has a priority that is established by said priority plan that is higher than the priority assigned to said Co-Processor.

4. The system recited in claim 3 in which at least one of said I/O units is a Direct Memory Access device and said means for generating an access request signal is connected to said circuit means.

5. The system recited in claim 4 in which each of said other I/O units, after obtaining access to said I/O Bus, maintains its connection until said I/O unit completes it current task and relinquishes control of said Bus.

6. The system recited in claim 5 in which each of said I/O units relinquishes control of said I/O Bus in response to the request signal of that unit becoming inactive.

7. The system recited in claim 6 in which said arbiter means includes a means repsonsive to a signal from said coprocessor indicating that access of said I/O bus has been relinquished, to momentarily disable said arbiter means to enable a new arbitration operation.

* * * * *